US008413245B2

(12) United States Patent
Kraemer et al.

(10) Patent No.: US 8,413,245 B2
(45) Date of Patent: Apr. 2, 2013

(54) METHODS AND APPARATUS PROVIDING COMPUTER AND NETWORK SECURITY FOR POLYMORPHIC ATTACKS

(75) Inventors: Jeffrey A. Kraemer, Wellesley, MA (US); Andrew Zawadowskiy, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 797 days.

(21) Appl. No.: 11/414,910

(22) Filed: May 1, 2006

(65) Prior Publication Data

US 2007/0143848 A1 Jun. 21, 2007

Related U.S. Application Data

(60) Provisional application No. 60/751,439, filed on Dec. 16, 2005.

(51) Int. Cl.
*G06F 11/00* (2006.01)
(52) U.S. Cl. .......... 726/24; 726/22; 726/23; 726/25; 705/51; 705/52; 705/53; 705/54; 713/189; 713/190; 713/191; 713/192; 713/193; 713/194; 717/174; 717/175; 717/176; 717/177; 717/178
(58) Field of Classification Search .......... 726/22–25; 705/51–54; 713/189–194; 717/174–178
See application file for complete search history.

(56) References Cited

U.S. PATENT DOCUMENTS 5,696,822 A * 12/1997 Nachenberg ............ 726/24
6,088,804 A 7/2000 Hill et al.
6,775,780 B1 8/2004 Muttik
6,898,715 B1 * 5/2005 Smithson et al. ........... 726/24
6,990,591 B1 * 1/2006 Pearson ..................... 726/22
7,007,302 B1 * 2/2006 Jagger et al. ............... 726/25
7,069,583 B2 * 6/2006 Yann et al. .................. 726/4
7,237,237 B2 6/2007 Foti
7,237,267 B2 6/2007 Rayes et al.
7,263,718 B2 8/2007 O'Brien et al.
(Continued)

FOREIGN PATENT DOCUMENTS

EP 1 418 484 A2 3/2003
WO WO 02/14989 A2 2/2002
(Continued)

OTHER PUBLICATIONS

PCT International Search Report and Written Opinion from the International Searching Authority having a date of mailing on Aug. 29, 2008, in co-pending PCT International Patent Application No. PCT/US07/10454 (International Filing Date of Apr. 30, 2007) and entitled "Methods and Apparatus Providing Computer and Network Security for Polymorphic Attacks".

(Continued)

*Primary Examiner* — Edan Orgad
*Assistant Examiner* — Roderick Tolentino
(74) *Attorney, Agent, or Firm* — Hickman Palermo Truong Becker Bingham Wong LLP (57) ABSTRACT

A system detects an attack on the computer system. The system identifies the attack as polymorphic, capable of modifying itself for every instance of execution of the attack. The modification of the attack is utilized to defeat detection of the attack. In one embodiment, the system determines generation of an effective signature of the attack has failed. The signature is utilized to prevent execution of the attack. The system then adjusts access to an interface to prevent further damage caused to the computer system by the attack.

20 Claims, 7 Drawing Sheets

U.S. PATENT DOCUMENTS

| | | | |
|---|---|---|---|
| 7,363,515 | B2 | 4/2008 | Frazier et al. |
| 7,380,267 | B2 | 5/2008 | Arai et al. |
| 7,401,360 | B2 | 7/2008 | Ravishankar et al. |
| 7,448,084 | B1 | 11/2008 | Apap et al. |
| 7,516,478 | B2 | 4/2009 | Limont et al. |
| 7,546,629 | B2 | 6/2009 | Albert et al. |
| 7,555,776 | B1 | 6/2009 | Lymer et al. |
| 7,565,426 | B2 | 7/2009 | Jones et al. |
| 7,715,315 | B1 | 5/2010 | Ferguson et al. |
| 7,716,716 | B1 | 5/2010 | Boystun |
| 7,739,685 | B2 | 6/2010 | Vaddagiri |
| 7,872,975 | B2 | 1/2011 | Kruse et al. |
| 7,875,975 | B2 | 1/2011 | Bernds et al. |
| 7,882,560 | B2 | 2/2011 | Kraemer et al. |
| 7,917,393 | B2 | 3/2011 | Valdes et al. |
| 7,965,717 | B2 | 6/2011 | Mistry et al. |
| 7,979,889 | B2 | 7/2011 | Gladstone et al. |
| 8,001,610 | B1 | 8/2011 | Chickering et al. |
| 8,004,980 | B2 | 8/2011 | Ferguson et al. |
| 8,065,712 | B1 | 11/2011 | Cheng et al. |
| 2002/0032871 | A1 | 3/2002 | Malan et al. |
| 2002/0078049 | A1 | 6/2002 | Samar |
| 2002/0078368 | A1 | 6/2002 | Yann et al. |
| 2002/0078381 | A1 | 6/2002 | Farley et al. |
| 2002/0166063 | A1 | 11/2002 | Lachman et al. |
| 2003/0027551 | A1* | 2/2003 | Rockwell ............... 455/410 |
| 2003/0084319 | A1* | 5/2003 | Tarquini et al. .......... 713/200 |
| 2004/0015719 | A1* | 1/2004 | Lee et al. ............... 713/201 |
| 2004/0054917 | A1 | 3/2004 | Obrecht et al. |
| 2004/0064737 | A1 | 4/2004 | Milliken et al. |
| 2004/0073617 | A1* | 4/2004 | Milliken et al. .......... 709/206 |
| 2004/0117624 | A1 | 6/2004 | Brandt et al. |
| 2004/0205474 | A1 | 10/2004 | Eskin et al. |
| 2004/0250124 | A1 | 12/2004 | Chesla et al. |
| 2005/0076227 | A1 | 4/2005 | Kang et al. |
| 2005/0166268 | A1 | 7/2005 | Szor |
| 2006/0021035 | A1 | 1/2006 | Conti et al. |
| 2006/0026669 | A1* | 2/2006 | Zakas ..................... 726/6 |
| 2006/0048228 | A1 | 3/2006 | Takemori et al. |
| 2006/0064755 | A1 | 3/2006 | Azadet et al. |
| 2006/0070128 | A1 | 3/2006 | Heimerdinger et al. |
| 2006/0123482 | A1 | 6/2006 | Aaron |
| 2006/0184682 | A1 | 8/2006 | Suchowski et al. |
| 2006/0191006 | A1* | 8/2006 | Satake et al. .............. 726/22 |
| 2006/0230124 | A1* | 10/2006 | Belfiore et al. ........... 709/219 |
| 2006/0230453 | A1* | 10/2006 | Flynn et al. .............. 726/24 |
| 2006/0236408 | A1* | 10/2006 | Yan ........................ 726/29 |
| 2006/0259967 | A1 | 11/2006 | Thomas et al. |
| 2007/0044152 | A1* | 2/2007 | Newman et al. ........... 726/24 |
| 2007/0136603 | A1 | 6/2007 | Kuecuekyan |
| 2007/0143824 | A1 | 6/2007 | Shahbazi |
| 2010/0082513 | A1 | 4/2010 | Liu |
| 2010/0242111 | A1 | 9/2010 | Kraemer et al. |

FOREIGN PATENT DOCUMENTS

| | | |
|---|---|---|
| WO | WO 02/103498 A2 | 12/2002 |
| WO | WO 03/058451 A1 | 7/2003 |

OTHER PUBLICATIONS

PCT International Search Report and Written Opinion from co-pending International Application No. PCT/US07/10409 having a mailing date of Jul. 8, 2008.

European Patent Office, Office Action, for foreign patent application No. 07776475.1-1245 dated Jun. 14, 2011, 5 pages.

Current claims in European patent application No. 07776475.1-1245, 4 pages, dated Jun. 2011.

Cohen I. et al., "Self Aware Services: Using Bayesian Networks for Detecting Anormalies in Internet-based Services", dated Dec. 31, 2001, 16 pages.

European Patent Office, Search Report, for foreign patent application No. 07756155.3-2212/20133728, dated May 3, 2011, 9 pages.

Current Claims for application No. 07756155.3-2212/20133728, dated May 2011, 5 pages.

European Patent Office, Search Report, for foreign patent application No. 06717493.8-2212/1834439 PCT/US2006000302 dated Jun. 29, 2011, 7 pages.

Current Claims in application No. 06717493.8-2212/1834439, 5 pages.

European Patent Office, EP International Search Report received in International Application No. 07835909.8 dated Mar. 1, 2012 (11 pages).

Current Claims, Application No. 07835909.8, dated Mar. 2012 (4 pages).

* cited by examiner

204 DETECT AN ATTACK ON THE COMPUTER SYSTEM

205 PROVIDE AT LEAST ONE CONTROL POINT IN THE COMPUTER SYSTEM, THE AT LEAST ONE CONTROL POINT USED TO FILTER EXECUTION OF THE ATTACK

206 RECEIVE NOTIFICATION FROM THE AT LEAST ONE CONTROL POINT THAT AN ATTACK HAS BEEN IDENTIFIED ON THE INTERFACE

OR

207 DETERMINE THE ATTACK CAUSES A SYSTEM FAILURE ON THE COMPUTER SYSTEM

OR

208 DETERMINE THE ATTACK CONTAINS A FIXED EXPLOIT CODE EXECUTABLE ON THE COMPUTER SYSTEM

OR

209 IDENTIFY THE ATTACK AS A DENIAL OF SERVICE ATTACK, BASED ON A TYPE OF POLICY VIOLATION CAUSED AS A RESULT OF THE ATTACK

214 DETERMINE GENERATION OF AN EFFECTIVE SIGNATURE OF THE ATTACK HAS FAILED, THE SIGNATURE UTILIZED TO PREVENT EXECUTION OF THE ATTACK

215 ATTEMPT TO IDENTIFY A SIGNATURE ASSOCIATED WITH THE ATTACK, THE SIGNATURE TO BE USED:
I) TO PREVENT FUTURE ATTACKS ON THE COMPUTER SYSTEM, AND
II) TO ASSOCIATE THE ATTACK WITH PREVIOUS ATTACKS IN AN EFFORT TO IDENTIFY THE SIGNATURE ASSOCIATED WITH THIS ATTACK

216 FAIL TO IDENTIFY AN EFFECTIVE SIGNATURE ASSOCIATED WITH THE ATTACK

*FIG. 6*

217 ADJUST ACCESS TO AN INTERFACE TO PREVENT FURTHER DAMAGE CAUSED TO THE COMPUTER SYSTEM BY THE ATTACK

218 DISABLE AN INTERFACE TO PREVENT ACCESS TO THAT INTERFACE BY THE ATTACK

219 DISABLE THE INTERFACE FOR A PREDETERMINED PERIOD OF TIME

OR

220 FILTER ACCESS TO THE INTERFACE TO PREVENT SUCCESSFUL LAUNCHING OF SUBSEQUENT ATTEMPTS OF THE ATTACK

*FIG. 7*

METHODS AND APPARATUS PROVIDING COMPUTER AND NETWORK SECURITY FOR POLYMORPHIC ATTACKS

CROSS REFERENCE TO RELATED APPLICATIONS

The present application claims the benefit of U.S. Provisional Patent Application No. 60/751,439, filed on Dec. 16, 2005, which is incorporated herein by reference.

BACKGROUND

Computer systems, networks and data centers are exposed to a constant and differing variety of attacks that expose vulnerabilities of such systems in order to compromise their security and/or operation. As an example, various forms of malicious software program attacks include viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Other malicious programs might operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computes to silently obtain otherwise confidential information such as usernames and passwords required to access protected data, lists, contents of files or even remote web sites user account information.

Computer system developers, software developers and security experts have created many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM that a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include virus attacks, worm attacks, trojan horse attacks, denial-of-service attacks, a buffer overflow operations, execution of malformed application data, and execution of malicious mobile code. Virus attacks, worm attacks, and trojan horse attacks are variants of each other that generally involve the execution of a program, for which a user often is unaware of its existence, that performs some undesired processing operations to comprise a computer's proper operation. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of Service attacks may also seek to crash the targeted machine (rather than simply consume resources). Buffer overflow attacks occur when programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

SUMMARY

Conventional technologies for providing computer security suffer from a variety of deficiencies. In particular, conventional technologies for providing computer security are limited in that conventional security software programs rely on the ability to periodically remotely receive information such as virus definitions that allow the conventional security software programs to identify and quarantine malicious programs. Many of the most common conventional forms of security software such as virus definitions programs rely upon obtaining the periodic virus definition updates from a centralized server accessed over the Internet that is maintained by the vendor of the security software. As a result, the most recent virus definition updates only reflects those viruses that have been recently detected, fingerprinted in inserted into the virus definition file by the vendor of that maintains and distributes the virus definition files.

Because conventional security software programs require periodic updates, such conventional security software programs are only as good as the most recent updates of the malicious program definitions (e.g., virus definitions) that individual instances of the conventional protection software have been able to receive. As an example, conventional virus detection software will not recognize viruses created and transmitted to a computer system that have not yet been identified and/or defined within the most recent update of a set of virus definitions obtained from a remote server. Accordingly, the malicious program code or data not defined within the most recent virus definitions update may be successfully inserted and executed within computer systems in a network in order to perform some of the malicious processing discussed above, even though such systems are equipped with conventional security software (i.e., virus detection software).

As a result, conventional security software program implementations are often several steps behind the prevention and spread of new attacks that are constantly being created and disseminated by malicious program developers. This problem is compounded by the fact that modern malicious programs are able to distribute themselves quickly to hundreds or thousands of computer systems on a network such as the Internet within a short amount of time, such as several hours, whereas most conventional security software only obtains updates on a less frequent basis, such as nightly. Additionally, modern malicious programs can modify themselves to appear to be a new attack (called a "Day Zero" attack because this is the first time the attack appears on the network) each time the malicious program runs. These malicious programs are known as polymorphic attacks for their ability to appear to be a "Day Zero" attack each time they execute. A polymorphic attack may not be completely different than a previous version of the same polymorphic attack, but may have portions of the attack that differ from the previous version of the same attack. There is however, a common portion between the two polymorphic attacks. The common portion is not necessarily contiguous.

Embodiments disclosed herein significantly overcome such deficiencies and provide a system that includes a polymorphic attack handling process. The polymorphic attack handling process rapidly identifies malicious attacks and prevents the spread of such attacks to other computer systems. In effect, embodiments disclosed herein provide for a self-healing computer network system. Embodiments disclosed herein include one or more security agents that operate within individual host computer systems in a network. The security agents can interact with a management center to obtain a security policy that contains a set of rules that indicate types of operations that may be allowed or disallowed within computer system. Once a security agent has obtained the security policy, the security agent operates a plurality of security interceptors that can watch over and monitor processing operations performed by various software and hardware components within the host computer system which that security agent protects. The security agent provides security to a computerized device by detecting processing outcomes produced via operation of a sequence of related processing operations within the computerized device. As an example, processing operations related to an inbound connection to a Web server can be monitored by various interceptors operating within different parts of the computer system's operating system and application layer code in order to detect the related sequence of processing operations that the inbound Web server connection attempt triggers. Each interceptor detects a specific event and transfers that event to an event correlation engine that records the processing outcomes and the sequence of related processing operations in a security history. The event correlation engine identifies a security violation when one of the detected processing operations in the security history produces a processing outcome that violates a security policy. This may be before, during or after occurrence of an undesired processing outcome within computer system such as a system crash, system error, protection violation, process disruption or other such undesired action as defined within the security policy. The security agent is then able to subsequently detect attempted performance of a similar sequence of related processing operations that attempt to produce at least one processing outcome that violates the security policy. In response, the security agent denies operation of at least a portion of the sequence of related processing operations within the computerized device to avoid violation of the security policy. The security agents can also mark or otherwise identify sequences of processing operations that led up to the security violation as a disallowed sequence of processing operations and can disseminate this information to other security agents operating on other host computer systems in the network in real-time (e.g., upon detection) in order to spread the knowledge of the behavior or processing pattern that the malicious attack attempted to perform on the computer system the detected the attack, so that other computer systems will not be vulnerable to the attack.

Embodiments disclosed herein significantly overcome such deficiencies and provide a system that includes a polymorphic attack handling process. The polymorphic attack handling process provides control points on a computer system, to detect an attack on the computer system. The polymorphic attack handling process detects, and identifies a polymorphic attack on the computer system. The polymorphic attack is capable of modifying itself each time the polymorphic attack runs, such that the polymorphic attack appears to be a "Day Zero" attack each time the polymorphic attack executes. The polymorphic attack handling process attempts to generate an effective signature of the attack and fails. The polymorphic attack handling process then filters access to the interface on which the polymorphic attack was detected. In one embodiment, the polymorphic attack handling process disables the interface on which the polymorphic attack was detected for a specified period of time.

Embodiments disclosed herein include a computer system executing a polymorphic attack handling process. The polymorphic attack handling process detects an attack on the computer system, and identifies the attack as a polymorphic attack. The polymorphic attack is capable of modifying itself for every instance of execution of the attack. The modification of the attack is utilized to defeat detection of the attack. The polymorphic attack handling process determines that generation of an effective signature of the attack has failed (the signature is utilized to prevent execution of the attack). The polymorphic attack handling process then adjusts access to an interface to prevent further damage caused to the computer system by the attack.

During an example operation of one embodiment, suppose the polymorphic attack handling process is monitoring a computer system. The polymorphic attack handling process detects an attack on the computer system, and determines the attack has caused a system failure. The polymorphic attack handling process attempts to identify the attack by comparing the exploit code, associated with the attack, against signatures generated from previous attacks. The polymorphic attack handling process recognizes that the current attack is slightly different than previous attacks, but does not match signatures of previous attacks. The polymorphic attack handling process identifies the current attack as a polymorphic attack, and attempts to generate a signature of the polymorphic attack. The polymorphic attack handling process fails to generate an effective signature, and adjusts an interface where the polymorphic attack was identified. In one embodiment, the polymorphic attack handling process disables the interface for a specified period of time. In another embodiment, the polymorphic attack handling process filters access to the interface to prevent further attacks. It should be noted that when the polymorphic attack handling process 'fails' to generate an effective signature, this can mean the signature is successfully generated, but the signature is too short to be effective in stopping future instances of the same polymorphic attack. A 'failed' signature can also mean a signature that matches 'good' traffic instead of only matching malicious traffic. In one embodiment, the signature generation succeeds, but the 'successfully' generated signature is only marginally better than the generated signature that is deemed to have 'failed'.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a system that includes a polymorphic attack handling process. The polymorphic attack handling process provides control points on a computer system, to detect an attack on the computer system. The polymorphic attack handling process detects, and identifies a polymorphic attack on the computer system. The polymorphic attack is capable of modifying itself each time the polymorphic attack runs, such that the polymorphic attack appears to be a "Day Zero" attack each time the polymorphic attack executes. The polymorphic attack handling process attempts to generate an effective signature of the attack. In one embodiment, the attempt to generate an effective signature fails. It should be noted that when the polymorphic attack handling process 'fails' to generate an effective signature, this can mean the signature is successfully generated, but the signature is too short to be effective in stopping future instances of the same polymorphic attack. A 'failed' signature can also mean a signature that matches 'good' traffic instead of only matching malicious traffic. In one embodiment, the signature generation succeeds, but the 'successfully' generated signature is only marginally better than the generated signature that is deemed to have 'failed'. The polymorphic attack handling process then filters access to the interface on which the polymorphic attack was detected. In one embodiment, the polymorphic attack handling process disables the interface on which the polymorphic attack was detected for a specified period of time. A polymorphic attack may not be completely different than a previous version of the same polymorphic attack, but may have portions of the attack that differ from the previous version of the same attack. There is however, a common portion between the two polymorphic attacks. The common portion is not necessarily contiguous.

Embodiments disclosed herein include a computer system executing a polymorphic attack handling process. The polymorphic attack handling process detects an attack on the computer system, and identifies the attack as a polymorphic attack. The polymorphic attack is capable of modifying itself for every instance of execution of the attack. The modification of the attack is utilized to defeat detection of the attack. The polymorphic attack handling process determines that generation of an effective signature of the attack has failed (the signature is utilized to prevent execution of the attack). The polymorphic attack handling process then adjusts access to an interface to prevent further damage caused to the computer system by the attack.

Figure 1:
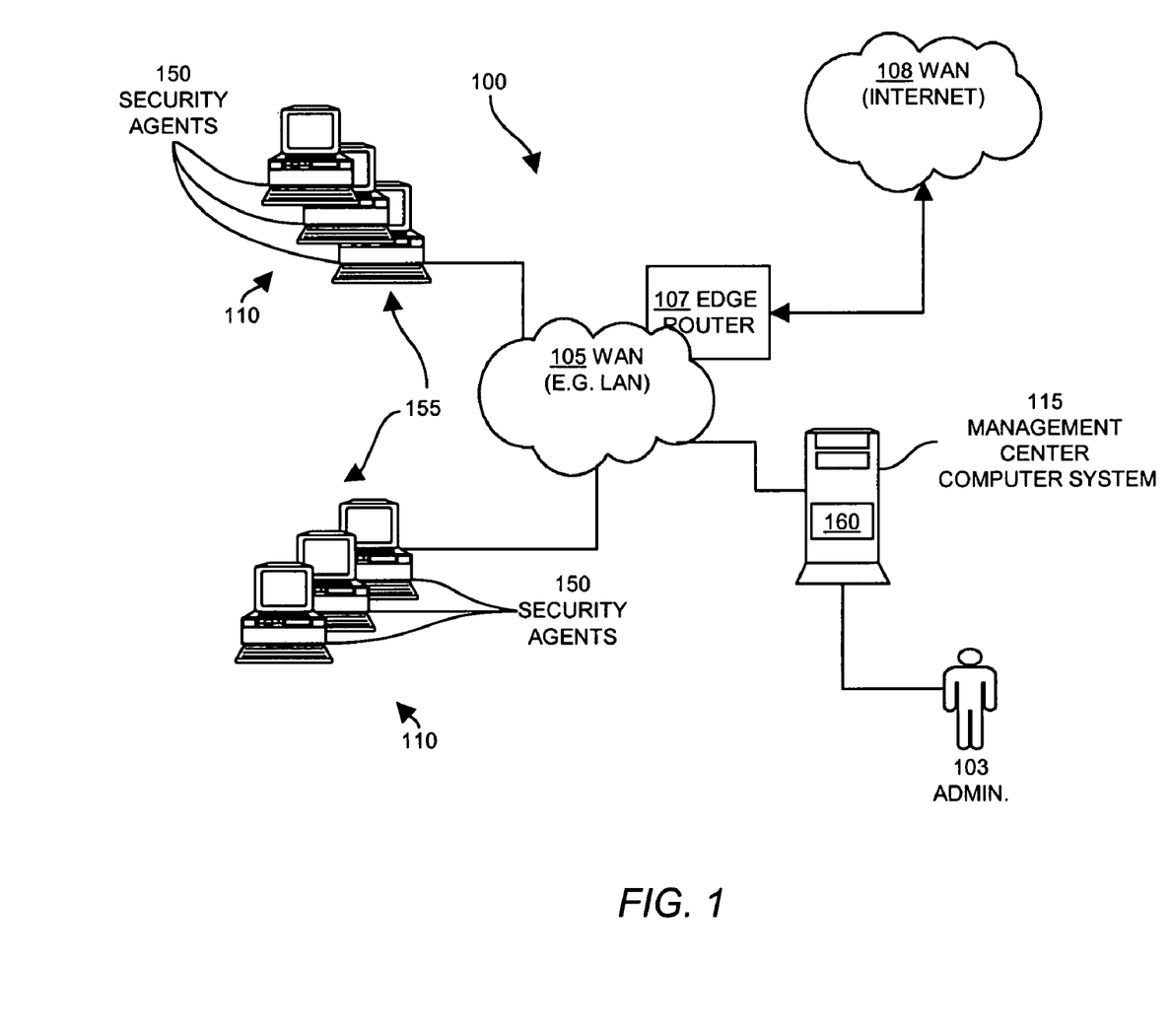
FIG. 1 illustrates an example configuration of a network environment that includes a security system configured as disclosed herein.

FIG. 1 illustrates an example computer networking environment 100 suitable for use in explaining example embodiments disclosed herein. The computer networking environment 100 includes a computer network 105 such as a local area network (LAN) that interconnects a security management computer system 115, an edge router 107, and a plurality of host computer systems 110, each of which operates (e.g., executes, runs, interprets or otherwise performs) a agent 150 configured as disclosed herein. Each agent 150 is running an instance of the polymorphic attack handling process 155. The security management computer system 115 also operates a management center application 160 that operates as disclosed herein. The edge router 107 couples the network 105 to a wide area network (WAN) 108 such as the Internet that allows communication between the computer systems 110, 115 and other computers worldwide. Note that the management center computer 115 may be isolated form the WAN 108 by a firewall that is not shown in this example.

The host computers 110 may be any type of computer system, workstation, server (e.g., web server), personal computer, laptop, mainframe, personal digital assistant device, general purpose or dedicated computing device or the like that operate any type of software, firmware or operating system. They may be physically or wirelessly coupled to the network 105 to support communications. The security agents 150 and management center application 160 operate to dynamically detect and prevent malicious attacks on the computers 110 without requiring the security agents 150 to continuously and periodically download signature or virus definition files. Generally, an administrator 103 installs the security agents 150 (including the polymorphic attack handling process 155) on the computer systems 110 that are to be protected and they are responsible for enforcing the appropriate security policy on those systems.

The security agents 150 (including the polymorphic attack handling process 155) have the ability to learn what causes security violations such as malicious attacks by monitoring, analyzing and recording processing behavior and events of the computer system 110 that occur prior to the security violation taking place, in order to prevent such events from occurring in the future. In other words, the security system disclosed herein in able to monitor and record processing behavior that results in an undesired processing operation such as a process exception, system crash or the like and is able to analyze recorded processing operations that led up to undesired operation or problem to identify the root cause of the failure. Once identified, the security system is able to prevent that single operation or sequence of processing operations identified as the root cause of failure from executing again on that or other computer system in order to avoid further security violations and to prevent such attacks on other computers. A security agent as disclosed herein can thus learn of new types of malicious attacks without having seen processing that causes such attacks in the past, and can prevent that attack in the future. The ability to learn of processing associated with a new attack, identify its root cause, and prevent it from happening in the future can occur without external input (e.g., virus definition files) being received by a computer system equipped with the security agent.

Security agent operation as explained herein includes being preprogrammed with certain known security violations in a rule-based security policy and preventing them from happening even a first time. In addition, such processing also involves recording and post-processing security history event data that result in a security violation (i.e., that was not preprogrammed and thus unrecognizable a first time) to identify a root cause (e.g., one or more processing operations or events) of the security violation within the computer system in order to prevent it from happening a second time. This can involve performing a local comparison of several security histories collected by a agent 150 in a single computer system 110 to identify a common pattern of processing activity that results in an undesirable processing outcome (i.e., a security violation). The security agents 150 can also transmit event and security history information to the management center 115.

The management center 115 acts as a central repository for all event log records generated by the security agents 150 and provides functions for monitoring and reporting. The management center 115 also correlates event records generated from security agents 150 operating on different computer systems 110 for purposes of detecting suspicious activity in the network.

Figure 2:
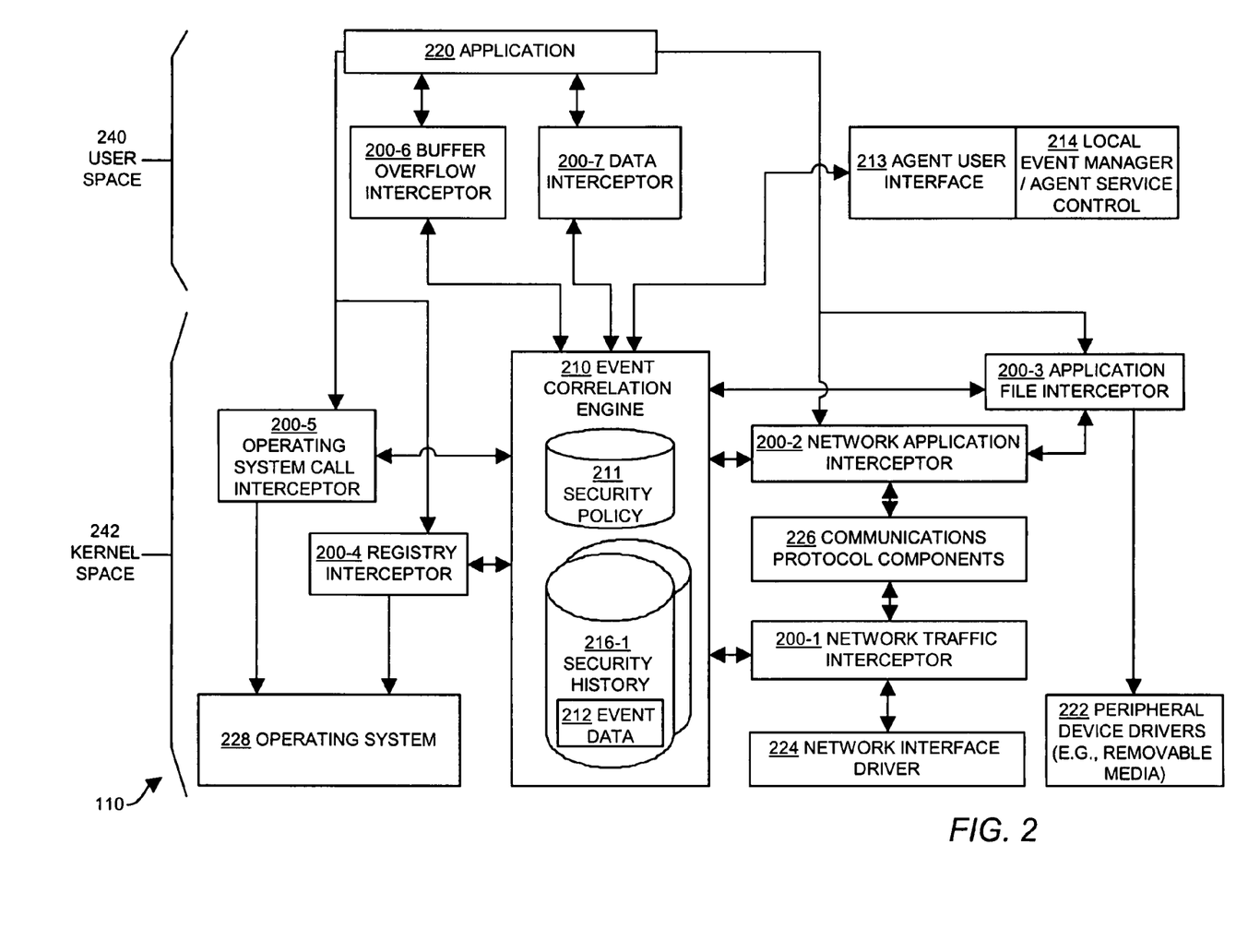
FIG. 2 illustrates example architecture of the computerized device configured with a security system in one example configuration.

FIG. 2 illustrates an architecture of a host computer system 110 configured with a security agent in accordance with one example embodiment. The security agent components include a plurality of security interceptors 200-1 through 200-7 including, for example, a network traffic interceptor 200-1, the network application interceptor 200-2, a file interceptor 200-3, a registry interceptor 200-4, a system call interceptor 200-5, a buffer overflow interceptor 200-6 and a data interceptor 200-7. The agent 150 in this example configuration also includes an event correlation engine 210, a security agent user interface 213, and local event manager 214. The event correlation engine 210 stores a security policy 211 that contains rules that are used to instruct the agent 150 to protects the computer 110 on which it operates by interpreting and enforcing the rules to restrict the operations that may be performed by that computer 110. An administrator 103 uses the management center application 160 to create and distribute security policies to each computer system 110 to be protected.

In one configuration, the network traffic interceptor 200-1 resides between a communications protocol component 226 (such as a TCP driver), and the network interface card 224 or other communications interface. The network traffic interceptor 200-1 looks at packets coming from the network before they get to the native operating system TCP stack and can detect malicious operations or instructions such as a remote computer scanning the computer system 110. Such attacks can include, for example, a ping of death attack, a TCP SYN flood attack, port scanning attacks and so froth. Other security interceptors 200 can include packet interceptors, connection interceptors, file sharing interceptors, data filter interceptors, registry interceptors, system call interceptors, and the like. The interceptors 200 can be installed and executed by using, for example, windows registry keys that create dependencies on standard Operating System (OS) dynamically linked libraries (dlls) so that the interceptor dlls 200 are loaded along with the appropriate windows dlls that they monitor. The interceptors can thus serve as wrappers to monitor processing operations of all calls made to any specific computer components.

This example configuration also includes several components that operate within the computer system 110 that are not part of the security agent architecture itself. In particular, this example configuration includes one or more software applications 220 that execute within a user space 240 within the computer system 110. The computer system 110 further operates several components in kernel space 242 such as one or more device peripheral device drivers 222, a network interface driver 224, communications protocol components 226, and an operating system 228. It is to be understood that the components 222 through 228 are illustrated as separate for purposes of description of operations disclosed herein, and that they may be combined together, such as an operating system that includes device drivers 222 and communication protocol components 226.

Generally, according to operations of embodiments disclosed herein, the interceptors 200 monitor processing activities and collect and report event data 212 to the event correlation engine 210 for the respective standard processing components 220 through 228 within the user and kernel spaces 240 and 242. The event correlation engine 210 stores the event data within one or more security histories 216. Event data 212 can include things such as the identification of new connection requests made to the network interface driver 224, as detected by the network traffic interceptor 200-1. As another example, the application file interceptor 200-2 can identify a processing activity such as an application 220 accessing a particular file via an operating system call and report this as event data 212 to the event correlation engine 210. There may be other interceptors 200 besides those illustrated in FIG. 2 and thus the interceptors 201 through 206 are shown by way of example only. The event correlation engine 210 correlates the event data 212 against the security policy 211 in order to provide an indication to the interceptors 200 of whether or not the processing activity associated with the event data should be allowed. The event correlation engine 210 can also instruct the interceptors 200 to collect more or less event data 212 as needed. By being able to track operations, in the event of an undesirable processing operation, the behavior of the computer system 110 can be analyzed and the series of events that took place that lead up the undesirable processing operation can be "fingerprinted" and marked so that if they occur again, they can be prevented prior to their full execution. In addition, by recording traces from multiple failures and determining a commonality between them, if several computer systems suffer similar attacks, a commonality between the attacks can be identified and prevented in the future, even in situations where the attacking program morphs its identity or changes it content.

Further details of configurations explained herein will now be provided with respect to a flow chart of processing steps that show the high level operations disclosed herein.

Figure 3:
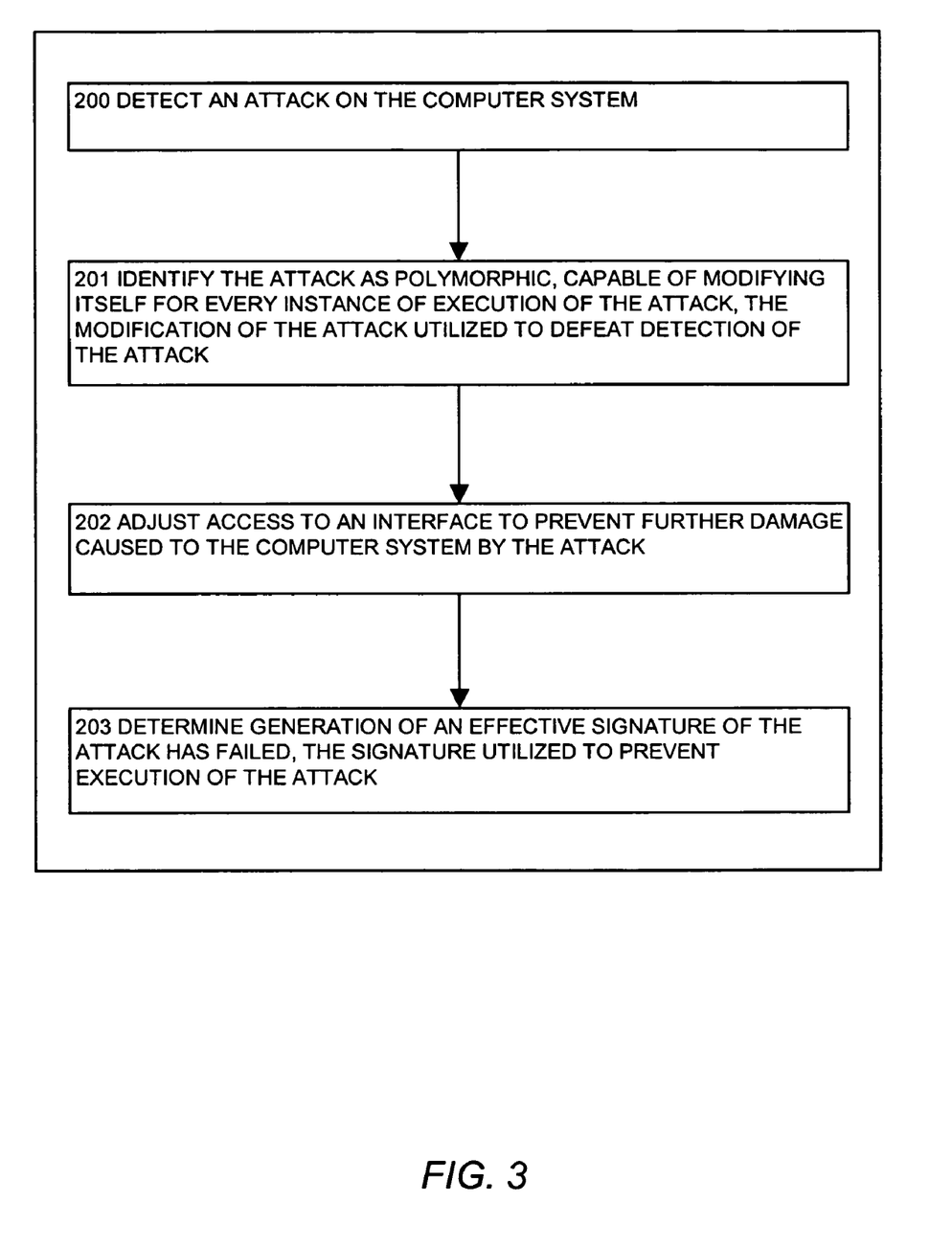
FIG. 3 illustrates a flowchart of a procedure performed by the system of FIG. 1 when the polymorphic attack handling process detects an attack on the computer system, according to one embodiment disclosed herein.

FIG. 3 is a flowchart of the steps performed by the polymorphic attack handling process when it detects an attack on the computer system, and adjusts access to an interface to prevent further damage (caused by the attack) to the computer system. Unless otherwise stated, the steps described below are unordered meaning that, when possible, the steps can be performed in any convenient or desirable order.

In step 200, the polymorphic attack handling process 155 detects an attack on the computer system. In an example embodiment, the polymorphic attack handling process 155, executing within the security agent 150, monitors the computer system to detect suspicious activity on the computer system. The security agent 150 monitors application and system behavior for malicious activity, and enforces security when policy violations occur. A common approach for malicious programs is to attack a host via the network, breaching well known services offered by the end system on the network. These exploits often attempt to replicate as worms, upload and execute malicious code, or simply perform a Denial of Service against the targeted application or host. The first time an attack is detected, the attack is referred to as a "Day Zero" attack.

In step 201, the polymorphic attack handling process 155 identifies the attack as polymorphic, capable of modifying itself such that at least a portion of the attack is different from at least one previous instance of the attack, the modification of the attack utilized to defeat detection of the attack. In an example embodiment, the polymorphic attack handling process 155 identifies the attack as a "fixed" exploit code that, for example, replicates a worm, or accesses a system resource on the computer system. In another example embodiment, the polymorphic attack handling process 155 identifies the attack is not, for example, a virus executing code on the computer system, but rather, causing a system or application failure, resulting in, for example, a Denial of Service attack. In yet another example embodiment, the polymorphic attack handling process 155 identifies the attack appears to be a "Day Zero" attack, but contains a payload that can be modified in an arbitrary fashion. Thus, the polymorphic attack handling process 155 identifies the attack as polymorphic. Each instance of the polymorphic attack is modified such that the polymorphic attack handling process 155 has difficulty generating a signature for the attack, and the polymorphic attack defeats the attempt to detect the polymorphic attack.

In step 202, the polymorphic attack handling process 155 adjusts access to an interface to prevent further damage caused to the computer system by the attack. In an example configuration, the polymorphic attack handling process 155 detects an attack on the computer system, and determines the attack is polymorphic. The polymorphic attack handling process 155 fails to generate an effective signature for the polymorphic attack, but identifies an interface failing as a result of the polymorphic attack. The polymorphic attack handling process 155 then adjusts access to that interface to prevent further damage to the computer system, by the polymorphic attack.

In step 203, the polymorphic attack handling process 155 determines generation of an effective signature has failed, the signature utilized to prevent execution of the attack. In an example embodiment, the polymorphic attack handling process 155 detects an attack on the computer system, identifies a type of attack (for example, a 'fixed' exploit code, a polymorphic attack, etc), and attempts to generate an effective signature for the attack. As each attack occurs, the polymorphic attack handling process 155 generates a signature for the attack. Repeated attacks of the same malicious code enables the polymorphic attack handling process 155 to refine the signature, generating a better signature each time that particular malicious code attacks the computer system. The signature is used to prevent future attacks of the same malicious code. In another example embodiment, the polymorphic attack handling process 155 detects an attack on the computer system, determines the attack is polymorphic, and determines the attempt to generate a signature has failed due to the inability of the polymorphic attack handling process 155 to identify a common payload in the polymorphic attack.

Figure 4:
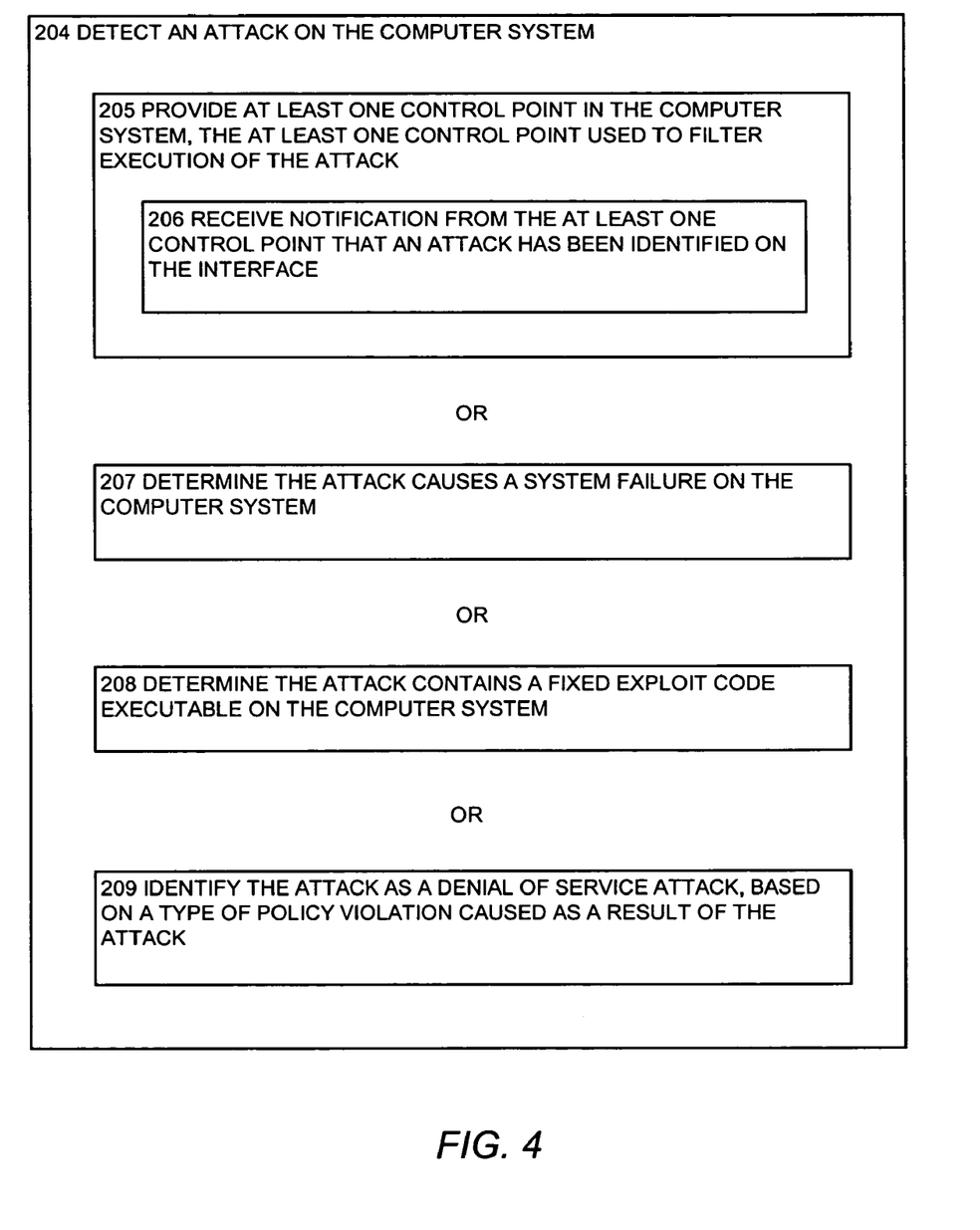
FIG. 4 illustrates a flowchart of a procedure performed by the system of FIG. 1 when the polymorphic attack handling process detects an attack on the computer system, and determines what type of attack is occurring on the computer system, according to one embodiment disclosed herein.

FIG. 4 is a flowchart of the steps performed by the polymorphic attack handling process when it detects an attack on the computer system, and determines what type of attack is occurring on the computer system.

In step 204, the polymorphic attack handling process 155 detects an attack on the computer system. In an example embodiment, the polymorphic attack handling process 155, executing within the security agent 150, monitors the computer system to detect suspicious activity on the computer system. The security agent 150 monitors application and system behavior for malicious activity, and enforces security when policy violations occur.

In step 205, the polymorphic attack handling process 155 provides at least one control point in the computer system, the at least one control point used to filter data associated with an execution of the attack. In an example embodiment, binary code of a well known exported function is modified to redirect function calls into a security sub routine. The security sub routine performs a set of required security checks, and then executes the original function call code. This technique may be used to modify not only drivers, but also application or DLL entry points. The control points are used to monitor behavior, as well as control access. The types of resources or system events, which may be monitored or controlled, include:

File and Directory access

Network access (both at the session level as well as the packet level)

Network traffic payload control (e.g., filter web URL or RPC calls, etc)

Registry access

COM object access control

Accessing system calls

Invoking applications

Handling exceptions

Detecting Buffer Overflows

CPU utilization

Memory utilization.

In step 206, the polymorphic attack handling process 155 receives notification from the at least one control point that an attack has been identified on the interface. In an example embodiment, the security agent 150 makes use of centrally defined security policies to enforce both static and behavioral controls over these types of system resources. The policies are tasked to stop "Day Zero" exploits at some point of execution. However, it is desirable to stop the exploit at the earliest possible time, to limit or prevent damage from occurring to the computer system as a result of the attack. The polymorphic attack handling process 155 detects a policy violation, determines a root cause of the policy violation (i.e., the attack on the computer system), and attempts to prevent the exploit from occurring again. Thus, the polymorphic attack handling process 155 receives notification, from at least one of the control points, that an attack has been identified on one of the interfaces on which a control point has been established.

Alternatively, in step 207, the polymorphic attack handling process 155 determines that the attack causes a failure of at least one component of the computer system. In an example embodiment, the polymorphic attack handling process 155 identifies an attack on the computer system. The polymorphic attack handling process 155 identifies that the attack is not executing code, but rather, causing a system or application failure.

Alternatively, in step 208, the polymorphic attack handling process 155 determines the attack contains an exploit code executable on the computer system. In an example embodiment, the polymorphic attack handling process 155 identifies an attack on the computer system. The polymorphic attack handling process 155 identifies a fixed exploit code that can be used to identify future attacks of this same exploit code. In an example embodiment, the polymorphic attack handling process 155 attempts to generate an effective signature for this attack.

Alternatively, in step 209, the polymorphic attack handling process 155 uses a type of policy violation resulting from the attack to identify the attack as a denial of service attack. In an example embodiment, the polymorphic attack handling process 155 identifies an attack on the computer system. The polymorphic attack handling process 155 identifies the attack as a polymorphic attack causing a system failure, such as a Denial of Service failure. The polymorphic attack handling process 155 determines the attack is a Denial of Service, based on a type of policy violation that occurs as a result of the attack.

Figure 5:
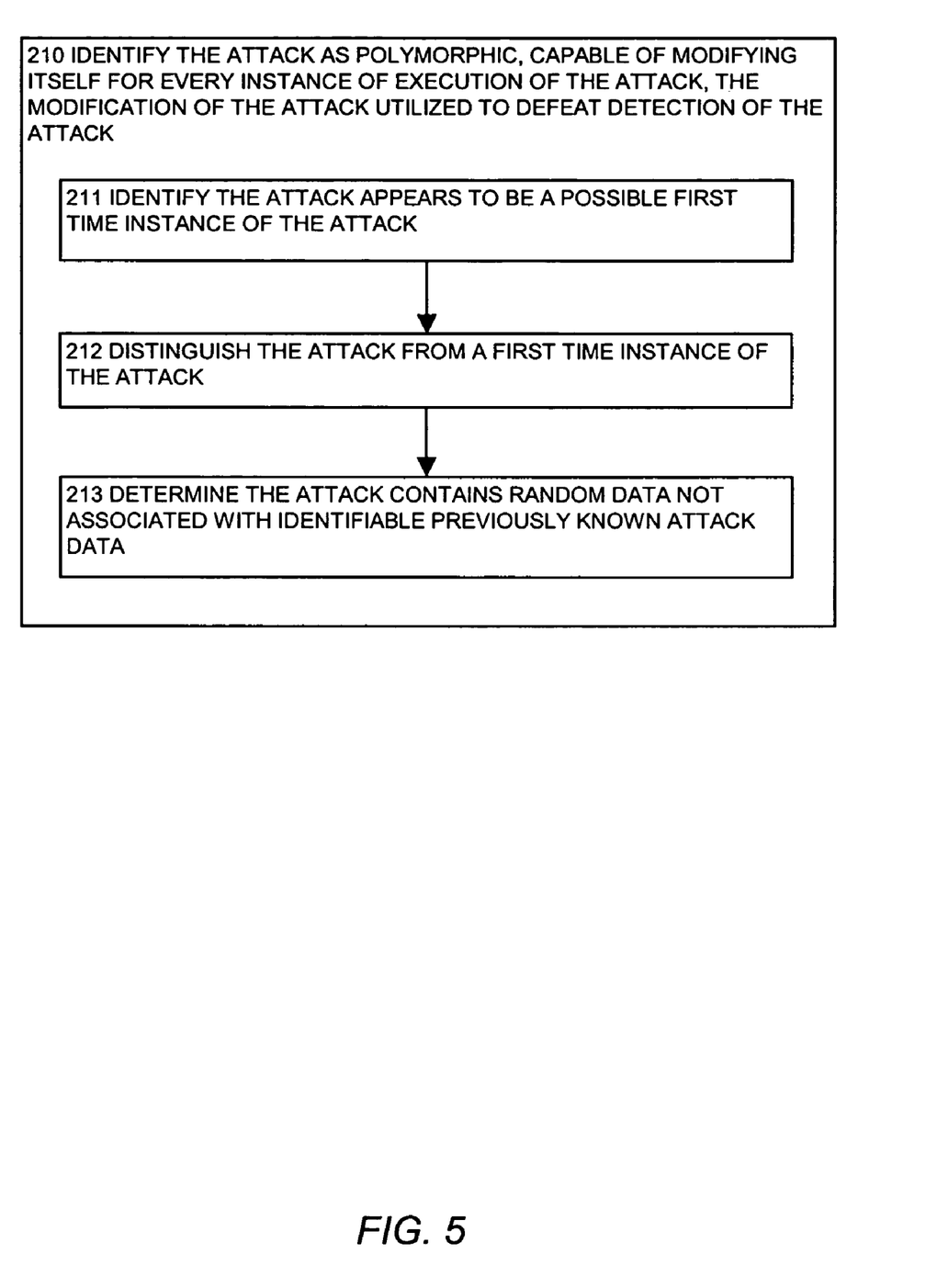
FIG. 5 illustrates a flowchart of a procedure performed by the system of FIG. 1 when the polymorphic attack handling process identifies the attack as polymorphic, capable of modifying itself for every instance of execution of the attack, the modification of the attack utilized to defeat detection of the attack, according to one embodiment disclosed herein.

FIG. 5 is a flowchart of the steps performed by the polymorphic attack handling process when it identifies the attack as polymorphic, capable of modifying itself such that at least a portion of the attack is different from at least one previous instance of the attack, the modification of the attack utilized to defeat detection of the attack.

In step 210, the polymorphic attack handling process 155 identifies the attack as polymorphic, capable of modifying itself such that at least a portion of the attack is different from at least one previous instance of the attack, the modification of the attack utilized to defeat detection of the attack. In an example embodiment, the polymorphic attack handling process 155 identifies the attack appears to be a "Day Zero" attack, but contains a payload that can be modified in an arbitrary fashion. Thus, the polymorphic attack handling process 155 identifies the attack as polymorphic. Each instance of the polymorphic attack is modified such that the polymorphic attack handling process 155 has difficulty generating an effective signature for the attack, and the polymorphic attack defeats the attempt to detect the polymorphic attack (and generate an effective signature).

In step 211, the polymorphic attack handling process 155 identifies the attack as a possible first time instance of the attack. In an example embodiment, when an attack occurs, policy violations are mapped back to the data containing the exploit code (executed by the attack). Once the exploit data has been identified, a signature is generated for this exploit and associated with the data interface that is processing this information (e.g., a URI, a specific RPC interface, a local RPC interface, a system function call, etc.), and potentially the source of the data. The signature is used to prevent this exact exploit from being repeated. The first time an attack occurs, it is referred to as a "Day Zero" attack. Thus, the polymorphic attack handling process 155 identifies that the attack appears to be a possible first time instance of the attack.

In step 212, the polymorphic attack handling process 155 distinguishes the attack from a first time instance of the attack. In an example embodiment, the polymorphic attack handling process 155 determines an attack has occurred, and attempts to generate an effective signature for the attack. The polymorphic attack handling process 155 compares the generated signature against previously generated 'good' signatures, and distinguishes the attack from a first time instance of the attack. Thus, the polymorphic attack handling process 155 determines the attack is not a first time instance of this attack.

In step 213, the polymorphic attack handling process 155 determines the attack contains random data not associated with identifiable previously known attack data. In an example embodiment, the polymorphic attack handling process 155 determines an attack has occurred, and attempts to generate an effective signature for the attack. The polymorphic attack handling process 155 identifies that some of the exploit code in the attack is similar to previous attacks, but does not match the signature of the previous attacks. Thus, the polymorphic attack handling process 155 determines the attack contains random data not associated with identifiable previously known attack data.

Figure 6:
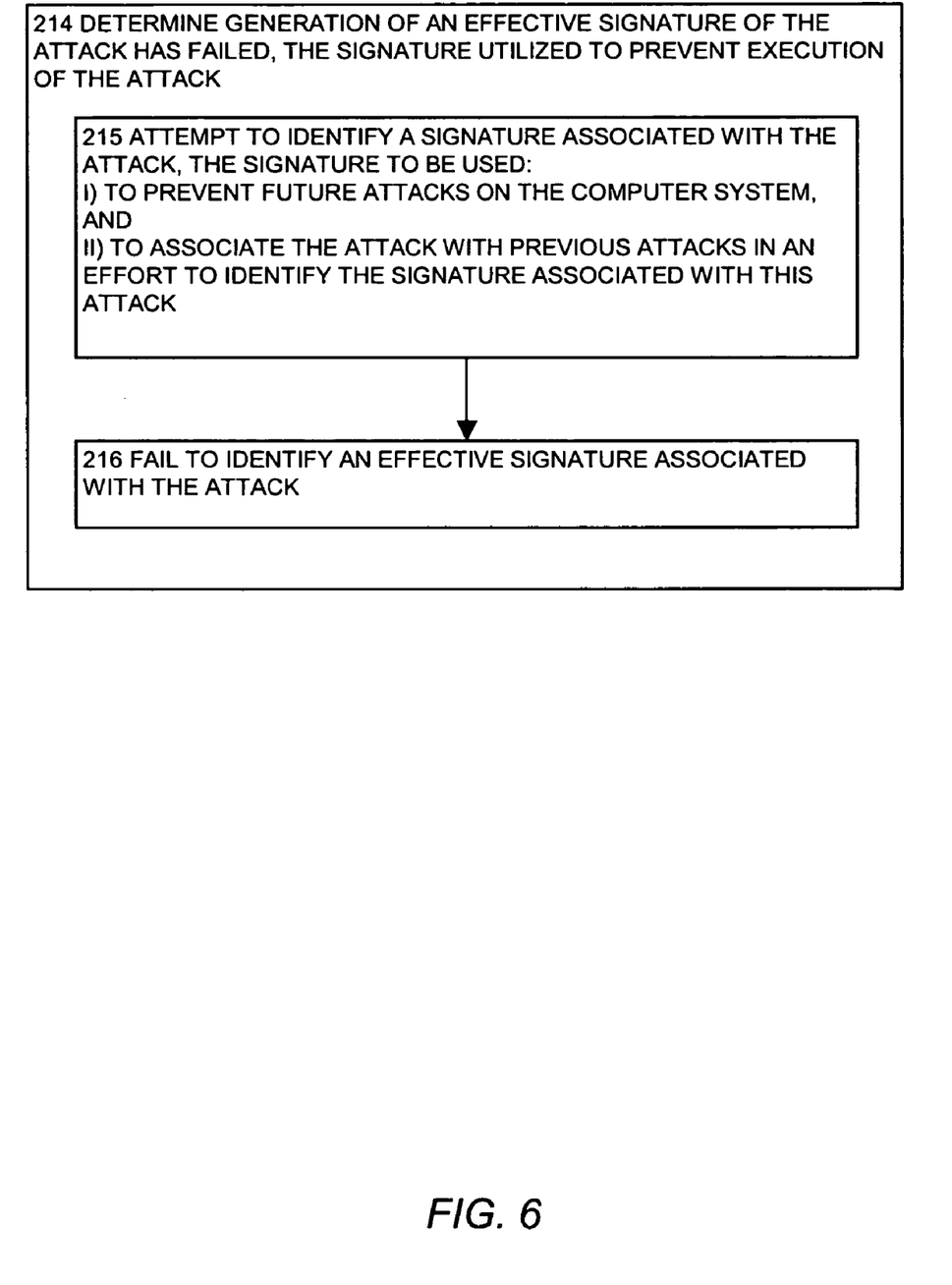
FIG. 6 illustrates a flowchart of a procedure performed by the system of FIG. 1 when the polymorphic attack handling process determines generation of an effective signature of the attack has failed, the signature utilized to prevent execution of the attack, according to one embodiment disclosed herein.

FIG. 6 is a flowchart of the steps performed by the polymorphic attack handling process when it determines generation of an effective signature of the attack has failed. The signature is utilized to prevent execution of the attack.

In step 214, the polymorphic attack handling process 155 determines generation of an effective signature has failed, the signature utilized to prevent execution of the attack. In an example embodiment, the polymorphic attack handling process 155 detects an attack on the computer system, identifies a type of attack (for example, a 'fixed' exploit code, a polymorphic attack, etc), and attempts to generate an effective signature for the attack. As each attack occurs, the polymorphic attack handling process 155 generates a signature for the attack. Repeated attacks of the same malicious code enables the polymorphic attack handling process 155 to refine the signature, generating a better signature each time that particular malicious code attacks the computer system. The signature is used to prevent future attacks of the same malicious code. The signature is shared with other computer systems within the network such that the computers systems in the network can contribute to refining the generated signature to produce an optimal signature for a detected attack.

In step 215, the polymorphic attack handling process 155 attempts to identify a signature associated with the attack, the signature to be used to prevent future attacks on the computer system, and to associate the attack with previous attacks, in an effort to identify the signature associated with this attack. In an example embodiment, the polymorphic attack handling process 155 determines an attack has occurred, and attempts to generate an effective signature for the attack. The signature is refined by comparing the new signature with previously generated signatures to create a 'better' signature. Once generated, the signature is shared with other hosts on the network to allow the hosts to generate a better signature more efficiently. The signature is also used to prevent future attacks on the computer system but preventing the same attack (identified by the signature) from occurring again.

In step 216, the polymorphic attack handling process 155 determines the attempt to generate an effective signature has failed. In an example embodiment, the polymorphic attack handling process 155 may not be able to generate a "better" signature, or even a common signature, even after repeated attacks of a polymorphic attack. For example, the polymorphic attack may be a Denial of Service. In this example, the sole purpose of the attack is to destabilize or crash an application or a host. There may not actually be any exploit code contained in the attack. The remainder of the attack data (i.e., the protocol headers, etc) may be perfectly legitimate, and not distinguishable from good traffic. In another example embodiment, the polymorphic attack handling process 155 may generate a signature for the polymorphic attack, but the signature may prevent good traffic from traveling through the network. Thus, the polymorphic attack handling process 155 fails to identify an effective signature associated with the attack.

Figure 7:
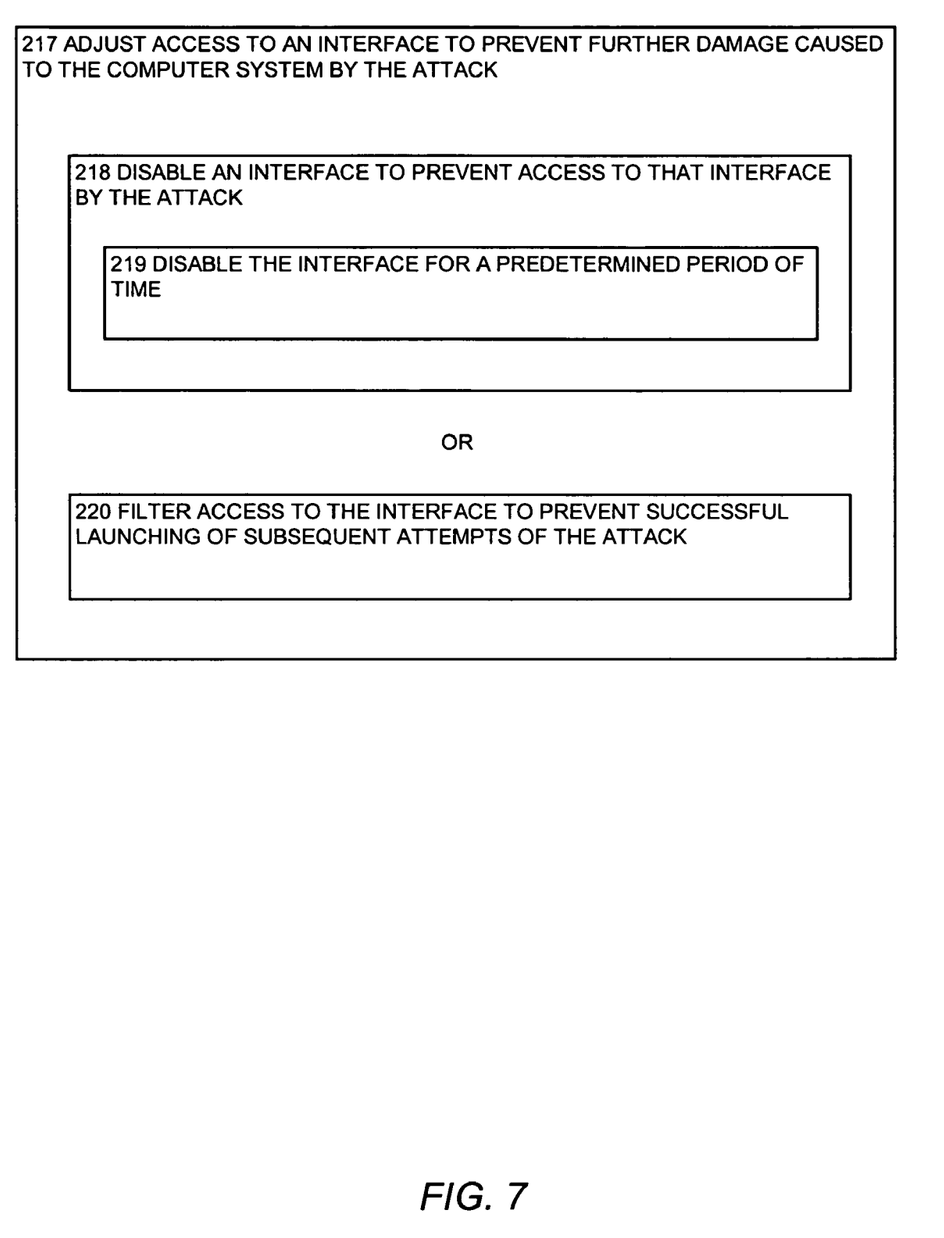
FIG. 7 illustrates a flowchart of a procedure performed by the system of FIG. 1 when the polymorphic attack handling process adjusts access to an interface to prevent further damage caused to the computer system by the attack, according to one embodiment disclosed herein.

FIG. 7 is a flowchart of the steps performed by the polymorphic attack handling process when it adjusts access to an interface to prevent further damage caused to the computer system by the attack.

In step 217, the polymorphic attack handling process 155 adjusts access to an interface to prevent further damage caused to the computer system by the attack. In an example configuration, the polymorphic attack handling process 155 detects an attack on the computer system, and determines the attack is polymorphic. The polymorphic attack handling process 155 fails to generate an effective signature for the polymorphic attack, but identifies an interface failing as a result of the polymorphic attack. The polymorphic attack handling process 155 then adjusts access to that interface to prevent further damage to the computer system, by the polymorphic attack.

In step 218, the polymorphic attack handling process 155 disables an interface to prevent access to that interface by the attack. In an example configuration, the polymorphic attack handling process 155 identifies an attack on an interface, and disables access to that interface to prevent further attacks on that interface. The polymorphic attack handling process 155 may selectively disable the interface, for example, by only disabling the interface for the IP address from which the attack was generated. The polymorphic attack handling process 155 may also disable the interface for all untrustworthy IP addresses or networks.

In step 219, the polymorphic attack handling process 155 disables the interface for a predetermined period of time. In an example embodiment, the polymorphic attack handling process 155 identifies an attack on an interface, and disables access to that interface to prevent further attacks on that interface. The polymorphic attack handling process 155 may disable the interface for a predetermined period of time during which the attack is occurring.

In step 220, the polymorphic attack handling process 155 filters access to the interface to prevent successful launching of subsequent attempts of the attack. In an example embodiment, the polymorphic attack handling process 155 identifies an attack on an interface, and filters access to that interface to prevent further attacks on that interface. The polymorphic attack handling process 155 may filter access to the interface by using the generated signature, even if the generated signature is not considered to be an effective signature, but a 'good enough' signature.

While the system and method have been particularly shown and described with references to configurations thereof, it will be understood by those skilled in the art that various changes in form and details may be made therein without departing from the scope of embodiments disclosed herein encompassed by the appended claims. Accordingly, the present embodiments disclosed herein are not intended to be limited by the example configurations provided above.

What is claimed is:

1. A method comprising:
monitoring, at each of a plurality of control points, one or more processing activities associated with each of a plurality of components of a computer system, each control point of the plurality of control points corresponding to one or more components of the plurality of components, each component having a corresponding interface;
detecting an attack on the computer system;
in response to the detecting, determining that the attack is a polymorphic attack;
in response to the determining, identifying a particular interface on the computer system that is failing as a result of the polymorphic attack;
determining that generation of a new signature will not be effective to prevent execution of the polymorphic attack;
in response to determining that generation of a new signature will not be effective to prevent execution of the polymorphic attack, adjusting access only to the particular interface at a particular control point established on the interface and not the entire computer system, wherein the particular control point is one of the plurality of control points;
wherein the method is performed by one or more processors.

2. The method of claim 1, wherein the one or more processing activities include at least one of file access, directory access, network access, network traffic payload control, registry access, COM object access control, accessing system calls, invoking applications, handling exceptions, detecting buffer overflows, CPU utilization, or memory utilization.

3. The method of claim 1, further comprising determining that the attack causes a failure of at least one of the plurality of components of the computer system.

4. The method of claim 1, further comprising determining that the attack contains exploit code executable on the computer system.

5. The method of claim 1, further comprising determining that the attack causes a violation of a security policy.

6. The method of claim 1, further comprising:
generating a signature for the attack;
determining the generated signature is not effective for identifying future attacks;
based on determining the generated signature is not effective, identifying the attack as polymorphic.

7. The method of claim 1, further comprising disabling the interface.

8. The method of claim 1, further comprising selectively disabling the interface.

9. The method of claim 8, further comprising disabling the interface based on the source of the attack.

10. The method of claim 1, further comprising disabling the interface for a period of time.

11. A non-transitory computer-readable storage medium encoded with computer program logic that, when executed by a computerized device, causes the device to perform:
monitoring, at each of a plurality of control points, one or more processing activities associated with each of a plurality of components of a computer system, each control point of the plurality of control points corresponding to one or more components of the plurality of components, each component having a corresponding interface;
detecting an attack on the computer system;
in response to the detecting, determining that the attack is a polymorphic attack;
in response to the determining, identifying a particular interface on the computer system that is failing as a result of the polymorphic attack;
determining that generation of a new signature will not be effective to prevent execution of the polymorphic attack;
in response to determining that generation of a new signature will not be effective to prevent execution of the polymorphic attack, adjusting access only to the particular interface at a particular control point established on the interface and not the entire computer system, wherein the particular control point is one of the plurality of control points.

12. The non-transitory computer-readable storage medium of claim 11, wherein the one or more processing activities include at least one of file access, directory access, network access, network traffic payload control, registry access, COM object access control, accessing system calls, invoking applications, handling exceptions, detecting buffer overflows, CPU utilization, or memory utilization.

13. The non-transitory computer-readable storage medium of claim 11, further encoded with computer program logic that causes the device to perform determining that the attack causes a failure of at least one of the plurality of components of the computer system.

14. The non-transitory computer-readable storage medium of claim 11, further encoded with computer program logic that causes the device to perform determining that the attack contains exploit code executable on the computer system.

15. The non-transitory computer-readable storage medium of claim 11, further encoded with computer program logic that causes the device to perform determining that the attack causes a violation of a security policy.

16. The non-transitory computer-readable storage medium of claim 11, further encoded with computer program logic that causes the device to perform:
generating a signature for the attack;
determining the generated signature is not effective for identifying future attacks;
based on determining the generated signature is not effective, identifying the attack as polymorphic.

17. The non-transitory computer-readable storage medium of claim 11, further encoded with computer program logic that causes the device to perform disabling the interface.

18. The non-transitory computer-readable storage medium of claim 11, further encoded with computer program logic that causes the device to perform selectively disabling the interface.

19. The non-transitory computer-readable storage medium of claim 18, further encoded with computer program logic that causes the device to perform disabling the interface based on the source of the attack.

20. The non-transitory computer-readable storage medium of claim 11, further encoded with computer program logic that causes the device to perform disabling the interface for a period of time.

* * * * *